W. R. TAYLOR.
NUT LOCK.
APPLICATION FILED OCT. 8, 1915.
1,228,262.
Patented May 29, 1917.
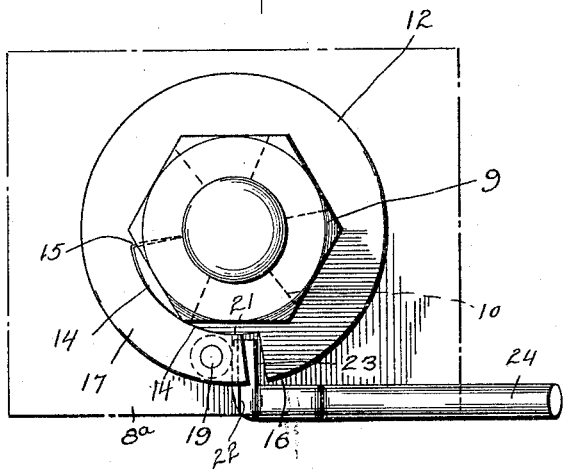
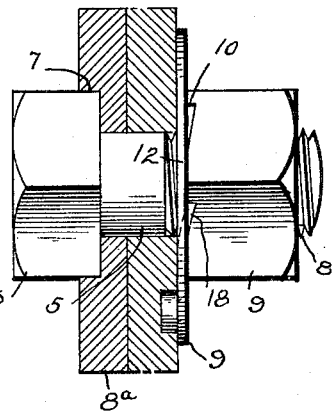
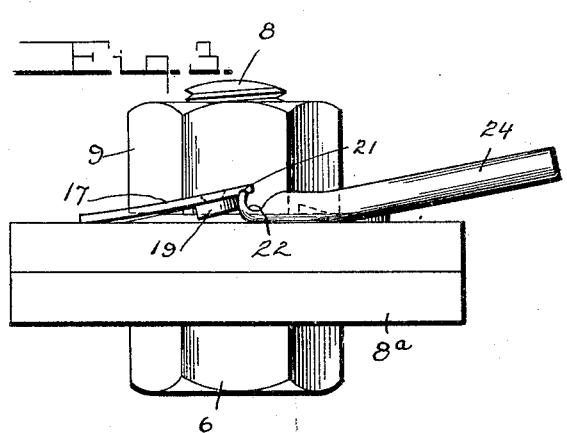
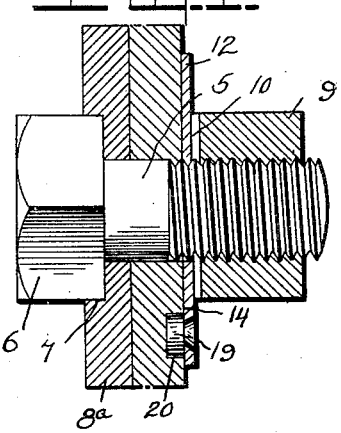
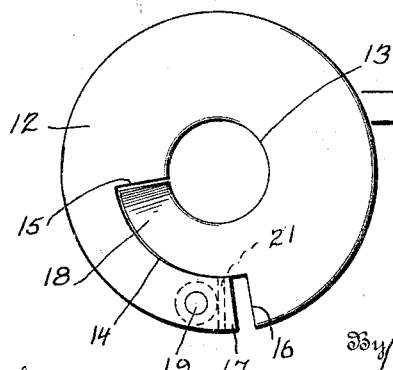
Witnesses
Inventor
W. R. Taylor
By
Attorney

UNITED STATES PATENT OFFICE.

WILLIAM R. TAYLOR, OF MONTICELLO, KENTUCKY.

NUT-LOCK.

1,228,262.

Specification of Letters Patent.  Patented May 29, 1917.

Application filed October 8, 1915. Serial No. 54,827.

*To all whom it may concern:*

Be it known that I, WILLIAM R. TAYLOR, a citizen of the United States, residing at Monticello, in the county of Wayne and State of Kentucky, have invented certain new and useful Improvements in Nut-Locks; and I do hereby declare the following to be a full, clear, and exact description of the invention, such as will enable others skilled in the art to which it appertains to make and use the same.

This invention relates to nut locks and more particularly to the type of lock generally known as lock washers in which a washer plate is interposed between the nut and the object engaged therewith to lock the nut against rotation.

The invention has for its object to provide an improved and simplified lock washer embodying novel features of construction tending to increase the efficiency of the lock and to render it more readily removable from operative position.

With this and other objects in view, the invention consists in the novel construction, arrangement and formation of parts as will be hereinafter specifically described, claimed and illustrated in the accompanying drawings, in which—

Figure 1 represents an end elevation of the improved nut lock,

Fig. 2 represents a side elevation thereof,

Fig. 3 represents a side elevation similar to Fig. 2 illustrating the nut lock in another position, Fig. 4 represents a longitudinal sectional view through the nut lock, Fig. 5 represents a plan view of the lock washer removed.

Referring to the drawing in detail, wherein similar reference numerals designate corresponding parts throughout the several views, the numeral 5 indicates a bolt of the usual or any preferred construction having a head fixed at one end preferably of polygonal formation and adapted to be engaged within a correspondingly shaped recess 7 formed in one side face of the object 8 with which the bolt is engaged, to lock the latter against rotation. The opposite extremity of the shank of the bolt 5 is formed with screw threads 8 on which is fitted a nut 9 having a plurality of radially directed ratchet teeth 10 upon its inner or object engaging face. A lock washer designated generally by the numeral 12 is positioned upon the bolt and is engaged between the nut 9 and the object 8. The lock washer 12 is formed with the usual bolt receiving aperture 13 formed centrally therein and is of considerably greater diameter than the nut 9. The lock washer 12 is formed with an arcuate slit 14 spaced approximately centrally between the edge of the bore or aperture 13 and the periphery thereof and formed concentric with the axis, and so arranged as to lie outwardly of the side faces and corners of the nut 9. The opposite ends of the arcuate slit 14 are connected with spaced radial slits 15 and 16, the slit 15 extending from one end of the arcuate slit 14 to the edge of the bore or aperture 13 and the slit 16 extending from the opposite end of the arcuate slit 14 to the periphery or circumferential edge of the washer and being of sufficient width to permit the insertion of the blade of a screwdriver or similar tool. The slit 16 is of adequate width to permit of the insertion of the blade of a screw driver or other tool designed to lift the outer tongue 17 defined by the slits 14, 15 and 16, for a purpose which will hereinafter appear, while the free end of the inner or nut engaging tongue 18 is curved laterally or in the direction of the longitudinal axis of the washer for engagement with the ratchet teeth 10 of the nut 9. A lug 19 is rigidly secured to the end of the outer or object engaging tongue 17 and projects outwardly of the opposite face of the washer 12 for engagement within a recess 20 formed in the object 8ª.

In use, the bolt is positioned as illustrated in Fig. 2 and the nut 9 is advanced thereon toward the object 8ª until the inner face thereof jams against the washer 12. In this position, the free curved end of the inner tongue 18 is engaged with one of the ratchet teeth 10 and thus locks the nut against rotary movement in one direction with relation to the lock washer 12. The lug 19 is also engaged in the recess 20 thus locking the washer against rotary movement upon the object 8ª. The washer plate is preferably formed of spring metal, and as the tongue 17 lies outwardly of the nut 9, it is evident that by lifting the tongue 17, the lug 19 is disengaged from the recess 20 and the nut 9 and washer 12 may be freely rotated bodily. To facilitate lifting of the spring tongue 17, I form a recess 21 in the under surface thereof outwardly of the lugs 19 in which is adapted to engage the curved end 22 of a laterally projecting head 23 carried by a handle 24. By engaging the curved edge 22 of the head in the relatively wide slit 16 and engaging it in the recess 21 and pushing inwardly upon the free end of the handle 24, the spring tongue 17 is moved outwardly of the object 8ª, as clearly illustrated in Fig. 3 and the lug 19 disengaged from the recess 20.

What I claim is:—

1. In a nut lock, a washer having an arcuate slit and radial slits at the terminals of the arcuate slit defining oppositely directed inner nut engaging and outer object engaging tongues.

2. In a nut lock, a washer having an arcuate slit and radial slits extending oppositely from the opposite ends of the arcuate slit defining oppositely directed and overlapping inner nut engaging and outer object engaging tongues, means carried by the outer object engaging tongue for engaging an object to lock the washer against rotation thereon, the inner nut engaging tongue having a curved end adapted to engage and lock a nut against rotation thereon.

3. A nut lock including a bolt, a circular washer positioned upon said bolt, a nut threaded upon said bolt, engaged with said washer and being of approximately one-half the diameter of the latter, said washer having an arcuate slit and radial slits at the opposite ends of the arcuate slit, defining oppositely directed inner nut engaging and outer object engaging tongues, the outer tongue lying outwardly of the nut and movable independently of the latter, the outer radial slit being of adequate width to permit of the insertion of the blade of a tool, ratchet teeth formed on the inner face of said nut adapted to be engaged by the inner tongue to lock the washer and nut against relative rotation, and means carried by the outer tongue adapted to engage an object to lock the washer against rotation thereon.

In testimony whereof I affix my signature in presence of two witnesses.

WILLIAM R. TAYLOR.

Witnesses:
FRANK M. LEE,
ROBT. E. LEE.

Copies of this patent may be obtained for five cents each, by addressing the "Commissioner of Patents, Washington, D. C."